(12) United States Patent
Bischinger

(10) Patent No.: US 10,856,132 B2
(45) Date of Patent: Dec. 1, 2020

(54) COMMUNICATION SYSTEM FOR COMMUNICATION IN A COMMUNICATION NETWORK WITH SUBNETWORKS

(71) Applicant: DEUTSCHE TELEKOM AG, Bonn (DE)

(72) Inventor: Kurt Bischinger, Vienna (AT)

(73) Assignee: DEUTSCHE TELEKOM AG, Bonn (DE)

(*) Notice: Subject to any disclaimer, the term of this patent is extended or adjusted under 35 U.S.C. 154(b) by 0 days.

(21) Appl. No.: 16/066,070

(22) PCT Filed: Dec. 23, 2016

(86) PCT No.: PCT/EP2016/082647
§ 371 (c)(1),
(2) Date: Jun. 26, 2018

(87) PCT Pub. No.: WO2017/114800
PCT Pub. Date: Jul. 6, 2017

(65) Prior Publication Data
US 2019/0014470 A1    Jan. 10, 2019

(30) Foreign Application Priority Data

Dec. 30, 2015   (DE) .......................... 10 2015 122 983
Dec. 30, 2015   (EP) ...................................... 15203175

(51) Int. Cl.
*H04W 8/08*      (2009.01)
*H04W 8/18*      (2009.01)
(Continued)

(52) U.S. Cl.
CPC ........... *H04W 8/08* (2013.01); *H04L 63/0876* (2013.01); *H04W 8/183* (2013.01);
(Continued)

(58) Field of Classification Search
CPC ....... H04W 8/08; H04W 8/183; H04W 48/18; H04W 76/11; H04W 12/0609; H04W 60/04; H04L 63/0876
See application file for complete search history.

(56) References Cited

U.S. PATENT DOCUMENTS

| 2004/0162058 A1 | 8/2004 | Mottes |
| 2012/0147824 A1 | 6/2012 | Van Der Merwe et al. |

(Continued)

FOREIGN PATENT DOCUMENTS

JP    2012182802 A    9/2012

OTHER PUBLICATIONS

NTT Docomo: "Network sclicing—service/traffic dependent selec", 3GPP Draft; S1-152156, 3rd Generation Partnership Project (3GPP), Mobile Competence Centre; 650, Route Des Lucioles; F-06921 Sophia-Antipolis Cedex; France, Bd. SA WG1, Nr. Belgrade, Serbia; Aug. 17, 2015-Aug. 21, 2015, Aug. 16, 2015 (Aug. 16, 2015), XP050990407, the whole document.

(Continued)

*Primary Examiner* — Wayne H Cai
(74) *Attorney, Agent, or Firm* — Leydig, Voit & Mayer, Ltd.

(57) ABSTRACT

A communication system for communication in a communication network having a first subnetwork and a second subnetwork includes a first identification entity assigned to the first subnetwork and configured to receive an identity of a communication terminal and identify the communication terminal on a basis of the identity for communication over the first subnetwork. The communication system additionally includes a second identification entity assigned to the second subnetwork and configured to receive the identity of the communication terminal and identify the communication terminal on the basis of the identity for communication over (Continued)

the second subnetwork. The communication system further includes a management entity configured to authenticate the communication terminal for communication over a particular subnetwork.

13 Claims, 5 Drawing Sheets

(51) Int. Cl.
    *H04W 48/18*     (2009.01)
    *H04W 12/06*     (2009.01)
    *H04W 76/11*     (2018.01)
    *H04L 29/06*     (2006.01)
    *H04W 60/04*     (2009.01)

(52) U.S. Cl.
    CPC ....... *H04W 12/0609* (2019.01); *H04W 48/18* (2013.01); *H04W 76/11* (2018.02); *H04W 60/04* (2013.01)

(56) References Cited

U.S. PATENT DOCUMENTS

| | | | | |
|---|---|---|---|---|
| 2013/0007232 A1* | 1/2013 | Wang | ................ | H04L 63/0272 709/222 |
| 2014/0086177 A1 | 3/2014 | Adjakple et al. | | |
| 2018/0262949 A1* | 9/2018 | Van Phan | ............ | H04L 1/1819 |
| 2018/0310238 A1* | 10/2018 | Opsenica | .............. | H04W 12/06 |
| 2019/0357104 A1* | 11/2019 | Onishi | .................... | H04W 8/02 |

OTHER PUBLICATIONS

Yoshinori Kitatsuji, et al., "Evolution of Wired Network for Future Advances Wireless Access Systems; Access Core Network for Mobile Systems", The Journal of IEICE, vol. 98, No. 5, May 1, 2015, pp. 2-14.

Ryutaro Kawamura, et al., "Road to 2012, The $4^{th}$, All of 5G, Quality Assurance in the End-to-End of Applications—The Delay Target of the Wireless Section is 1 Millisecond", Nikkei Communications vol. 622, Oct. 30, 2015, pp. 2-10.

Japanese Office Action, issued by the Japanese Patent Office dated Jul. 16, 2019, pp. 1-5.

Anonymous, "$31^{rd}$ Generation Partnership Project; Technical Specification Group Services and System Aspects; Feasibility Study on New Services and Markets Technology Enablers; Stage 1 (Release 14)," 3GPP Draft; TR22 891-V120-RM: 1-96 (Dec. 9, 2015). XP051071179.

Anonymous, "View on 5G | 3GPP RAN 5G Workshop", 3GPP workshop (Sep. 18, 2015).

\* cited by examiner

COMMUNICATION SYSTEM FOR COMMUNICATION IN A COMMUNICATION NETWORK WITH SUBNETWORKS

CROSS REFERENCE TO RELATED APPLICATIONS

This application is a U.S. National Stage Application under 35 U.S.C. § 371 of International Application No. PCT/EP2016/082647 filed on Dec. 23, 2016, and claims benefit to German Patent Application No. DE 10 2015 122 983.8 filed on Dec. 30, 2015, and European Patent Application No. EP 15203175.3 filed on Dec. 30, 2015. The International Application was published in German on Jul. 6, 2017 as WO 2017/114800 A1 under PCT Article 21(2).

FIELD

The present invention relates to a communication system for communication in a communication network with several subnetworks, in particular in a 5G-communication network with a plurality of slices.

BACKGROUND

The fifth generation of mobile technology (5G) concerns the requirements and technical challenges of the future communication networks from around the year 2020 and beyond. A fully mobile and connected society is thereby addressed, which is characterized by tremendous growth of traffic and mutual networking on multiple levels.

In 5G new radio interfaces are needed so as to meet the requirements of using higher frequencies, for example for new applications such as the Internet of Things (IoT), and for special capabilities, such as shorter runtime, which go beyond what 4G communication networks are able to deliver. In this case, 5G is considered as an end-to-end system that includes all the network aspects with a design that allows a high degree of convergence. 5G will fully use the current access mechanisms and their possible developments, including today's fixed network access technologies and many other yet to be developed access technologies.

5G will operate in a highly heterogeneous environment, i.e. with several types of access technologies, multi-layer networks, various types of communication devices and user interactions etc. The most diverse applications with diametrical requirements must be optimally supported, for example fail-safe, robust communications, communications with low data rates, or broadband communication in densely populated areas. In such an environment, there is a fundamental desire for 5G in order to fulfill a seamless and consistent a seamless and consistent user experience over time and space. For the operator of a 5G communications network there is a need to optimally and dynamically adapt the resources used to the specific requirements in order be able to support the variety of applications simultaneously.

Therefore, in 5G firstly there is a need to increase the efficiency of communication, especially to provide a higher throughput, lower latency, particularly high reliability, a much higher connection density, and a greater range of mobility, but on the other hand also the operational flexibility to provide increased and customized features with the lowest possible use of resources. This increased efficiency is expected along with the ability to control highly heterogeneous environments and the ability to safeguard trust, identity and privacy.

SUMMARY

In an embodiment, the present invention provides a communication system for communication in a communication network, wherein the communication network has a first subnetwork and a second subnetwork. The communication system includes a first identification entity assigned to the first subnetwork and configured to receive an identity of a communication terminal, and identify the communication terminal on a basis of the identity for communication over the first subnetwork. The communication system additionally includes a second identification entity assigned to the second subnetwork and configured to receive the identity of the communication terminal and identify the communication terminal on the basis of the identity for communication over the second subnetwork. The communication system further includes a management entity configured to authenticate the communication terminal for communication over a particular subnetwork.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide for increasing the flexibility and reliability of communication, especially in 5G.

The methods and systems presented below may be of different types. The individual described elements can be realized by hardware or software components, for example electronic components which can be produced by various technologies, for example semiconductor chips, ASICs, microprocessors, digital signal processors, integrated electrical circuits, electro-optical circuits and/or passive components.

The devices, systems and methods presented below are suited to transmit information over a communication network. The term communication network or communication net here designates the technical infrastructure over which the transmission of signals takes place. The communication net essentially comprises the switching network in which the transmission and switching of signals between the fixed-position devices and platforms of the mobile network or fixed network take place, as well as the access network in which the transmission of signals between a network access device and the communication terminal occurs. The communication network may in this case comprise both the components of a mobile network and the components of a fixed network. In the mobile network, the access network is also referred to as an air interface and comprises, for example, a base station (NodeB, eNodeB, radio cell) with mobile radio antenna to establish communication with a communication terminal such as for example a mobile phone or smartphone, or a mobile device with wireless adapters In the fixed network, the access network comprises for example a DSLAM (digital subscriber line access multiplexer) for connecting wire or cable connected communication terminals of a plurality of subscribers. Communication can be relayed to other networks for example of other network operators, e.g. foreign networks, via the switching network.

Figure 1:
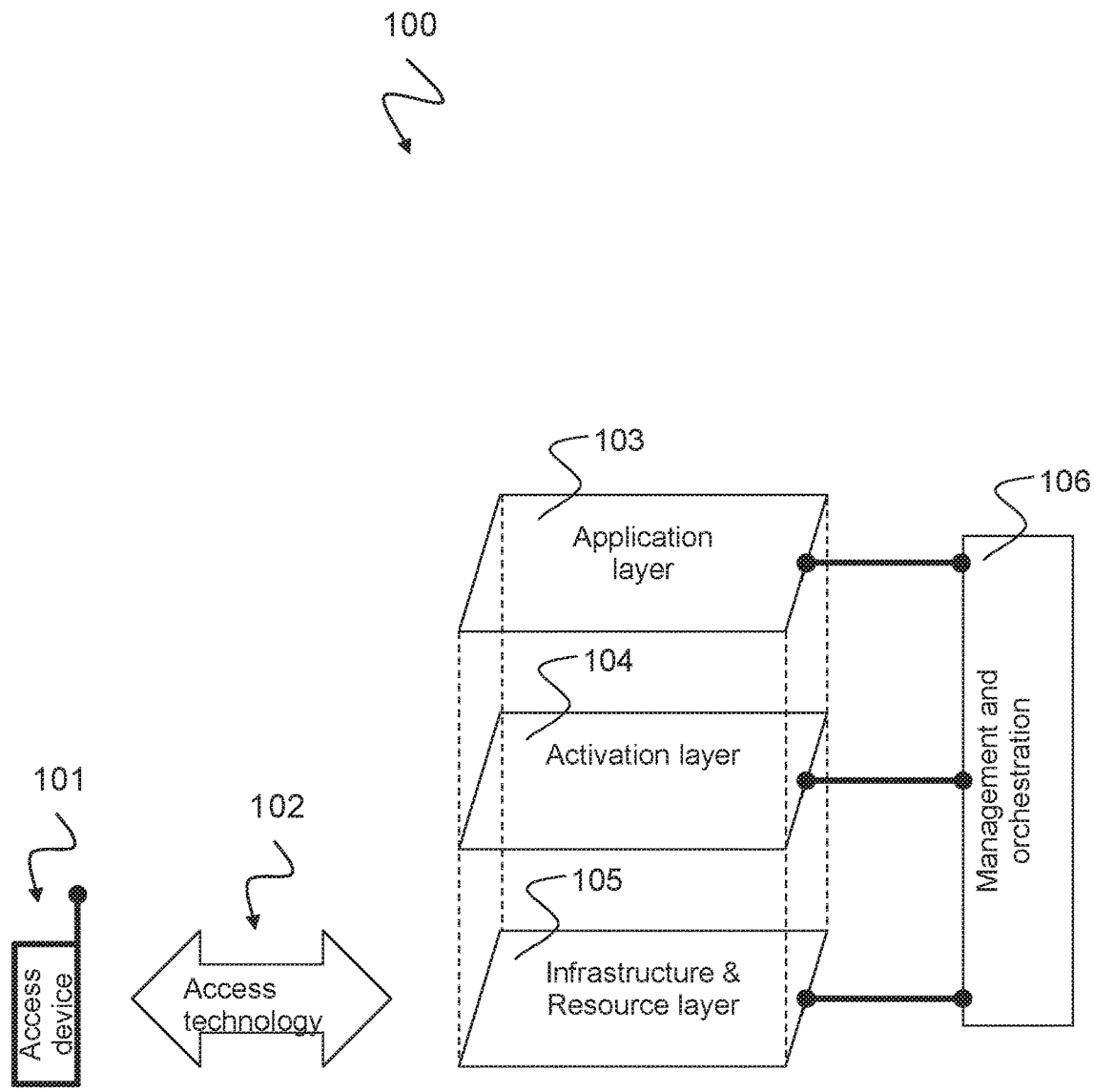
FIG. 1 is a schematic representation of a 5G system architecture 100.

The devices, systems and methods presented below are provided to increase communication in communication networks, particularly in communication networks according to the 5G system architecture presented below. FIG. 1 shows a schematic representation of such 5G system architecture 100. The 5G system architecture 100 includes a region having 5G communication terminals 101, which are connected via different access technologies 102 to a multi-layered communication structure comprising an infrastructure and resources layer 105, an activation layer 104 and an application layer 103, which are managed via a management and orchestration plane 106.

The Infrastructure and Resources layer 105 includes the physical resources of a convergent network structure of fixed and mobile components ("Fixed-Mobile Convergence") with access nodes, cloud nodes (consisting of processing and storage nodes), 5G devices such as mobile phones, portable devices, CPEs, machine communication modules and other network nodes and related links. 5G devices may include multiple and configurable capabilities and act as a relay for example, or hub, or depending on the particular context operate as computer/storage resource. These resources are made available to the higher layers 104, 103 and the management and orchestration plane 106 via corresponding APIs (application program interfaces). Monitoring of performance and the configurations are an inherent part of such APIs.

The activation layer 104 comprises a library of functions that are needed within a converged network in the form of building blocks of a modular architecture. These include functions that are realized by software modules that may be retrieved from a storage location to the desired location, and a set of configuration parameters for certain parts of the network such as the radio access. These features and capabilities can be accessed on demand by the management and Orchestration plane 106 by using the appropriate APIs. For certain features, multiple variants may exist, for example, different implementations of the same functionality which have a different performance or characteristic. The different degrees of performance and capabilities offered can be used to distinguish the network functions substantially more than is possible in today's networks, for example to offer as mobility function a nomadic mobility, vehicle mobility or an air traffic mobility depending on the specific needs.

The application layer 103 includes specific applications and services of the network operator, the company, the vertical operator or third parties who use the 5G network. The interface to the management and Orchestration plane 106 allows, for example, to build specific, i.e. dedicated network slices (slices network) for an application, or assign an application to an existing network slice.

The management and orchestration plane 106 is the point of contact in order to convert the required application cases (use cases, also business models) into actual network functions and slices. It defines the network slices for a given application scenario, chains the relevant modular network functions, assigns the relevant performance configurations and maps everything onto the resources of the infrastructure and resource layer 105. The management and orchestration plane 106 also manages scaling of the capacity of these functions and their geographical distribution. In certain applications, it may also have capabilities that allow third parties to create and manage their own network slices using APIs. Due to the numerous tasks of the management and orchestration plane 106, this is not a monolithic functionality block but rather a collection of modular functions that integrate the advances that have been achieved in different network domains, such as NFA (network function virtualization), SDN (software-defined networking) or SON (self-organizing networks). The management and orchestration plane 106 utilizes data aided intelligence so as to optimize all aspects of service composition and delivery.

Figure 2:
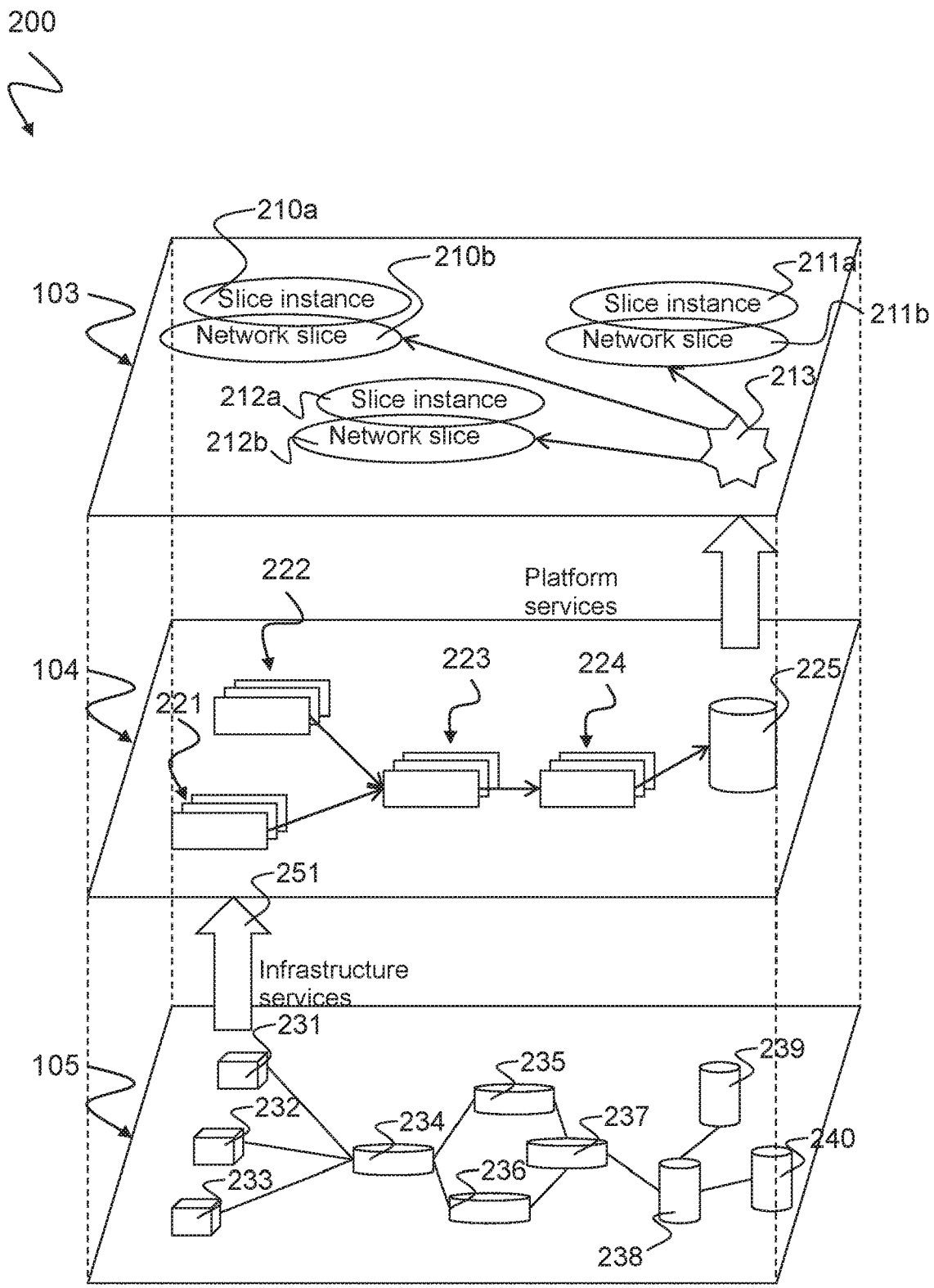
FIG. 2 is a schematic representation of a 5G-communication network with a plurality of slices (slices network) 200.

The here presented devices, systems and methods are provided to improve the communication in communication networks, in particular in 5G communication networks with multiple network slices (slices network), as described below. FIG. 2 shows a schematic representation of a 5G communication network 200 with multiple network slices (slices network). The 5G-communication network infrastructure 200 comprises an infrastructure layer 105, an activation layer 104 and an application layer 103.

The infrastructure and resources layer 105 includes all of the physical assets that are associated with a network operator, i.e. sites, cable, network nodes, etc. This layer 105 forms the basis for all network slices. It is structured as generically as possible without too many specialized physical units. The infrastructure and resources layer 105 conceals any kind of user-specific implementation in relation to the upper layers, so that the remaining systems for different slices can be optimally used. Components of the infrastructure and resource layer 105 are based on hardware and software or firmware that is required for each operation, and is thereby made available as infrastructure and resource layer 105 to the higher layers as resource objects. For example, objects of infrastructure and resources layer 105 include virtual machines, virtual links or connections and virtual networks, such as virtual access nodes 231, 232, 233, virtual network nodes 234, 235, 236, 237 and virtual computer nodes 238, 239, 240. As the term "virtually" implies, the infrastructure and resource layer 105 makes the objects available in the form of "infrastructure as service" 251, i.e. in an abstracted, virtualized form to the next higher layer 104.

The activation layer 104 is disposed above the infrastructure and resources layer 105. It uses the objects of the infrastructure and resource layer 105 and adds additional functionality to them in the form of (for example, non-physical) software objects/VNFs of every type so as to allow creation of any type of network slices and thus to provide a platform as a service to the next higher layer 103.

Software objects may exist in any granularity, and comprise a tiny or a very large fragment of a network slice. In order to allow the generation of network slices on a suitable level of abstraction, in the activation layer 104 different abstracted objects 221 are combined with other abstracted objects and with virtual network functions 222 so as to form combined objects 223, which can be converted to aggregated objects 224, and made available in an object library 225 of the next higher plane. Thus, the complexity can be hidden behind the network slices. For example, a user can create a mobile broadband slice and in the process define only KPI (Key Performance Indicators) without having to stipulate specific features such as individual local antenna coverage, backhaul links and specific degrees of parametrization. To support an open environment and allow addition or deletion of network functions on demand, is an important capability of the activation layer 104 that it supports the dynamic rearrangement of functions and connectivities in a network slice, for example by using SFC (service function chaining) or modifying software so that the functionality of a slice can be completely pre-defined and may include both approximately static software modules and addable software modules.

A network slice can hereby be regarded as software-defined entity that is based on a set of objects that define a complete network. The activation layer 104 plays a key role in the success of this concept because it can include all software objects that are necessary to provide the network slices and the corresponding capabilities to handle the objects. The activation layer 104 may be considered a type of network operating system complemented by a network creation environment. An essential object of the activation layer 104 is to define the corresponding levels of abstraction. In this way network operators have sufficient scope to design their network slices, while the platform operator can still maintain and optimize the physical nodes. This for example the execution of routine tasks such as adding or replacing NodeBs etc. is supported without the intervention of the network customers. Defining suitable objects that model a complete telecommunications network is one of the essential tasks of the activation layer 104 in developing the network slices environment.

A network slice, also referred to as 5G slice supports communication services of a certain type of connection with a particular type of manipulation of the C-(Control) and U-(User Data) layer. A 5G Slice is made up of a collection of different 5G network functions and specific radio access technology (RAT) settings that are combined together for the benefit of the specific application case or use case. Therefore, a 5G Slice can span all domains of the network, such as software modules running on cloud nodes, specific configurations of the transport network that support a flexible location of the functions, a particular radio configuration, or even a particular access technology as well as a configuration of 5G devices. Not all slices contain the same features; some functions which today appear to be essential for a mobile network may not even occur in some slices. The intention of the 5G slice is to provide only the functions that are necessary for the specific use case and to avoid all other unnecessary functionalities. The flexibility behind the slice concept is the key both for expanding existing applications as well as for creating new application cases. Third party devices thus be granted to control certain aspects of slicing via suitable APIs so as to provide such tailored services.

The application layer 103 includes all created network slices 210b, 211b, 212b and offers these as "network as service" to different network users, for example different customers. The concept allows the reuse of defined network slices 210b, 211b, 212b slice for different users, such as customers, for example, as a new network slice instance 210a, 211a, 212a. That is, a slice network 210b, 211b, 212b, which is associated with, for example, an automotive application, can also be used for applications of various other industrial applications. The slice instances 210a, 211a, 212a, which are generated by a first user may for example, be independent of the slice instances that are created by a second user, even though the entire network slice functionality may be the same.

According to embodiments of the invention, communication systems are provided for communication in a communication network, wherein the communication network has a first subnetwork and a second subnetwork, with: a first identification entity which is assigned to the first subnetwork and is configured to receive an identity of a communication terminal, and to identify the communication terminal on the basis of the identity for communication over the first subnetwork; a second identification entity, which is assigned to the second subnetwork and is configured to receive the identity of the communication terminal, and to identity the communication terminal on the basis of the identity for communication over the second subnetwork; and a management entity, which is configured to authenticate the communication terminal for communication over the particular subnetwork.

Based on the subnetwork structure of the communication network, the performance of the communication can be increased, for communication lines can be configured depending on the identity of the communication terminal over the first subnetwork of the second subnetwork. In this way service-independent communication becomes possible, i.e. depending on the requested service, the communication is conducted over a corresponding subnetwork, which provides the requested services and the corresponding infrastructure. In particular, a higher data throughput, lower latency, especially high reliability, a much higher connection density, and a greater range of mobility can be achieved. Together with the increased performance, the communication system can also include highly heterogeneous environments and promises to safeguard capacity, trust, identity, and privacy of the users.

According to one embodiment of the communication system, the specific identification entity is configured to transmit the identity to the management entity and the management entity is configured to authenticate the communication terminal on the basis of the transmitted identity. This has the advantage of efficient communication, as a central management entity can authenticate the particular communication terminal, and can assign the corresponding subnetwork to it. Thus the complexity can be hidden behind the subnetwork in the management entity.

According to one embodiment of the communication system, the management entity is configured to authenticate the communication terminal by assigning subnetworks of the communication network to the communication terminals, in particular by assigning subnetworks to identities of communication devices. This has the advantage that the management entity can easily identity a communication terminal by querying an assignment, for example of a table or a memory array. The management entity can dynamically apply or alter this allocation, so that new services or applications can be quickly made available to the communication terminal.

According to one embodiment of the communication system, the management entity is configured to authenticate the communication device for communication over the first subnetwork if the first subnetwork is assigned to the identity of the communication terminal, or to authenticate the communication terminal for communication over the second subnetwork if the second subnetwork is assigned to the identity of the communication terminal. This has the advantage that the management entity functions as central intelligence at the layer of the subnetworks, i.e. of the application layer according to the overview in FIG. 1, and can quickly carry out the authentication of the communication terminal for the corresponding subnetwork, without the need for a request to higher network layers, which are arranged for example in the management and orchestration plane according to the overview in FIG. 1.

According to one embodiment of the communication system, the management entity is configured to transmit a subnetwork identifier of the second identification entity to the first identification entity if the communication terminal is authenticated for communication over the second subnetwork, or to transmit a subnetwork identify of the first identification entity to the second identification entity if the communication terminal is authenticate for communication over the first subnetwork. This has the advantage that upon contact of the communication terminal with the first identification entity, the latter can respond to the query of the communication terminal, in that it transmits the subnetwork identifier of the second identification entity to the communication terminal and that can show the communication terminal which subnetwork may be used to connect with the communication network. The same applies to the opposite case of contact of the communication terminal with the second identification entity. Thus a recursive connection setup becomes possible without the communication terminal having to know the subnetwork over which it must connect to the communication network.

According to one embodiment of the communication system, the first identification entity is configured to transmit the subnetwork identifier of the second subnetwork transmitted from the management entity to the communication terminal or the second identification entity, or the second identification entity is configured to transmit the subnetwork identifier of the first subnetwork received from the management entity to the communication terminal or the first identification entity. This has the advantage that upon contact of the communication terminal with the first identification entity, the latter can respond to the query of the communication terminal by transmitting the subnetwork identifier of the second identification entity to the communication terminal or the second identification entity, so that a connection setup can be established. In the case of transmission of the subnetwork identifier to the second identification entity, the latter is able to respond to a communication query of the communication terminal. The same applies to the opposite case of contact of the communication terminal with the second identification entity. Thus a recursive connection setup is possible without the communication terminal having to know the subnetwork over which it must be connected to the communication network.

According to one embodiment of the communication system, a subnetwork identifier is assigned to each subnetwork (lookup table), and the management entity is configured to assign the communication terminal on the basis of at least one of the following assignments to the subnetwork identifier: an assignment to the identification of the communication terminal, in particular a hardware identifier of the communication terminal such as IMSI (international mobile subscriber Identity) or IMEI (international mobile station equipment identity) or eID (embedded identifier) and/or an assignment of a communication service to the communication terminal and/or an assignment of a software application to the communication terminal and/or of an operating system of the particular communication terminal to one of the two subnetworks. This has the advantage that the communication terminal can be assigned to a subnetwork using multiple identifiers, such as IMSI, IMEI, eID of a communication service, a software application, or an operating system, which offers a higher degree of flexibility.

The assignments of subnetwork and subnetwork identifier can be managed efficiently by means of a lookup table by the management entity. Subnetworks can be assigned to different applications or services, so that the communication terminal can communicate in further dependence hereon over multiple subnetwork. The subnetworks differ from one another in their different functions, services, or applications.

According to one embodiment of the communication system, the communication network is a network of a fifth generation (5G) or a further generation, and the first subnetwork and the second subnetwork are slices of the communication network.

Thus all advantages of the 5G network structure according to FIGS. 1 and 2 can be realized, such as higher radio frequencies with higher data throughput, new applications such as the Internet of Things, and special capabilities such as shorter run time, which go beyond what 4G communication networks are able to deliver. The communication network can offer an end-to-end system, which contains all network aspects with a high degree of convergence. Furthermore, the existing access mechanisms and their possible further developments can be used in full.

According to one embodiment of the communication system, a particular identification entity is configured to receive a subnetwork identifier from the communication terminal, and to assign to the communication terminal that subnetwork of the communication network that is assigned to the received subnetwork identifier or corresponds to a subnetwork indicated by the received subnetwork identifier (roaming). This has the advantage that the services are made available to the communication terminal over the corresponding subnetwork to which it is assigned, for example through a prior registration or prior setting of the operator of the communication system. Furthermore, this has the advantage that roaming can thereby be efficiently realized by the particular identification entity. In addition, the advantage is achieved that the communication system can comprise multiple communication networks of the same structure, for example a home communication network and a foreign communication network, and permits efficient roaming.

According to one embodiment of the communication system, the first identification entity is configured to establish communication of the communication terminal over the first subnetwork if the communication terminal is authenticated for communication over the first subnetwork, and the second identification entity is configured to establish communication of the communication terminal over the second subnetwork if the communication terminal is authenticated for communication over the second subnetwork. This has the advantage that each subnetwork can independently establish a communication link with the communication terminal if the communication terminal is so authenticated.

According to one embodiment of the communication system, the particular identification entity is configured to authorize the communication terminal for communication, to establish or modify a communication bearer, to track a communication bearer when there is a change in network identity of the particular subnetwork, and to relay the communication to a further identification entity of the communication network. This has the advantage that the particular subnetworks can be decoupled from one another and must have the particular identification entities only for the functionalities that are necessary to perform signaling over the particular subnetwork.

According to one embodiment of the communication system, the particular identification entity is configured to manage a location of the communication terminal. This has the advantage that localization services can be realized by querying the particular identification entity.

According to one embodiment of the communication system, the communication system has a base station to which the first identification entity and the second identification entity are communicatively connected, and the base station is configured to receive a connection request from the communication terminal with the identification, and to relay the identification to the particular identification entity for the purpose of identifying the communication terminal. This has the advantage that the communication terminals can be mobile and that their communication queries can be relayed over a base station, e.g. an eNodeB to the particular identification entities of the subnetwork. The communication terminals do not have to know the subnetwork to which they are assigned; it suffices to send a connection request over the base station in order to be allocated to a corresponding subnetwork.

According to one embodiment of the communication system, the first subnetwork is a default subnetwork, and the base station is configured to receive the connection request of the communication terminal and to forward it to the first identification entity if the connection request does not have a subnetwork identifier that identifies a subnetwork. This has the advantage that the communication terminals here do not have to known the subnetwork to which they are assigned. They can submit the connection request without subnetwork identifier over the base station, which then forwards the connection request to a default subnetwork. The communication system has the intelligence to resolve the connection request and to report to the communication terminal the subnetwork assigned to it, or to establish the communication of the corresponding subnetwork.

In the following detailed description reference is made to the accompanying drawings which form a part hereof, and in which specific embodiments are shown by way of illustration in which the invention may be practiced. It is understood that other embodiments may be utilized and structural or logical changes may be made without departing from the concept of the present invention. The following detailed description is therefore not to be understood in a limiting sense. Further, it is understood that the features of the various exemplary embodiment described herein may be combined with each other, unless specifically stated otherwise.

Embodiments of the invention are described below with reference to the drawings, wherein like reference numerals generally refer to like elements. In the following description, numerous specific details are set forth to provide a thorough understanding of one or more aspects of the invention for purposes of illustration. However, for a skilled person, it may be apparent that one or more aspects or embodiments can be carried out with a lesser degree of the specific details. In other instances, well-known structures and elements are shown in schematic form in order to facilitate describing one or more aspects or embodiments. It is understood that other embodiments may be utilized and structural or logical changes may be made without departing from the concept of the present invention.

Although a particular feature or aspect of an embodiment may have been disclosed with respect to only one of several implementations, such a feature or such an aspect may be combined with one or more other features or aspects of other implementations as may be desired and advantageous for a given or specified application. Furthermore, to the extent that the expressions "contain," "have," "with," or other variants thereof are used either in the detailed description or the claims, such expressions are inclusive in a manner similar to the expression "comprise." The expressions "coupled" and "connected" can be used along with the derivatives thereof. It is understood that such expressions Are used to indicate that two elements cooperate or interact with one another independently of whether they are in direct or electrical contact or are not in direct contact with one another. In addition the expression "exemplary" should be understood only as an example rather than as a term for the best or optimal. The following description is therefore not to be understood in a limiting sense.

Figure 3:
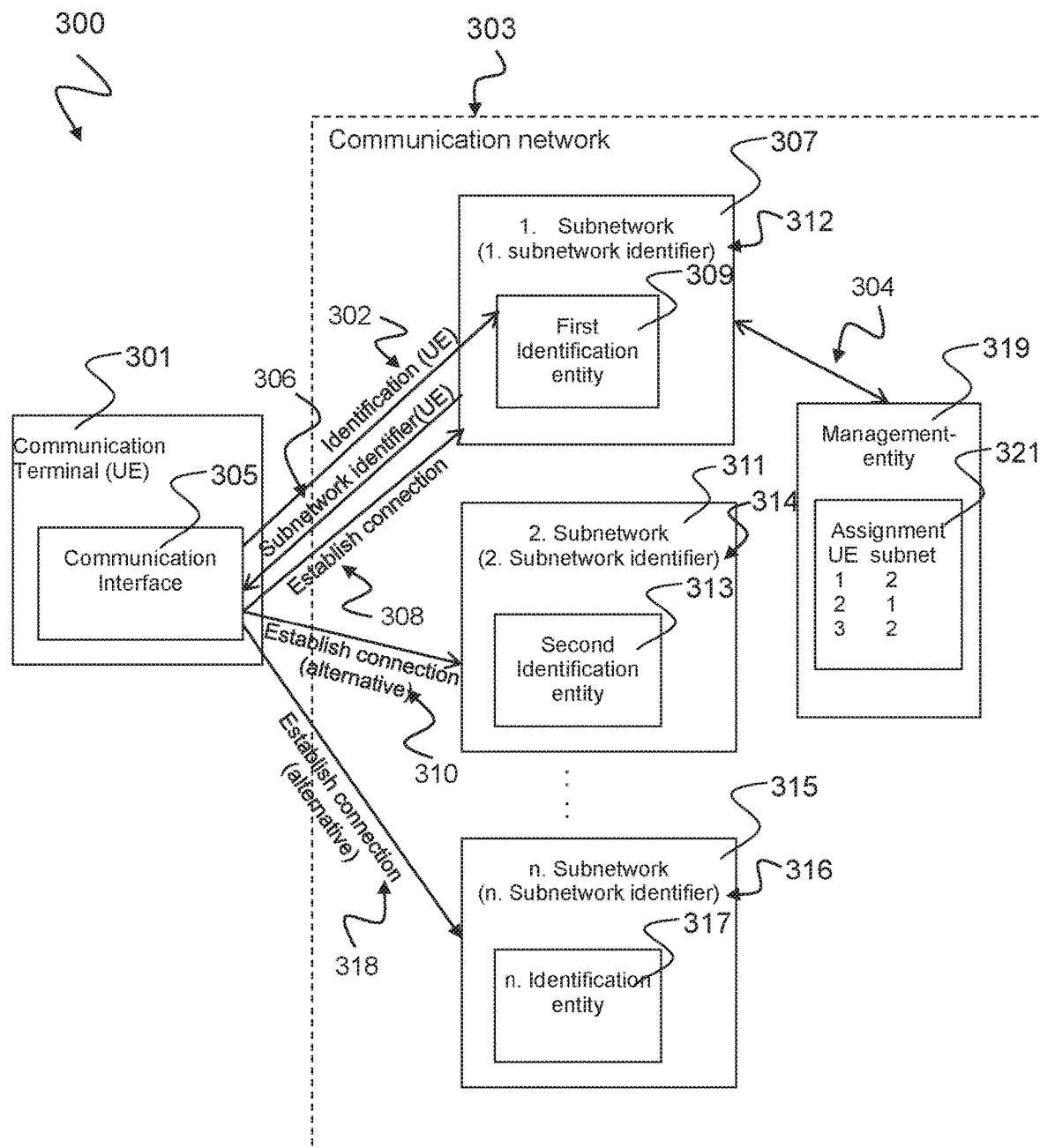
FIG. 3 is a schematic representation of a communication system 300 having a communication terminal 301 and a communication network 303 according to an embodiment of the invention.

FIG. 3 shows a schematic representation of a communication system 300 having a communication terminal 301 and a communication network 303 according to an exemplary embodiment. The communication terminal 301 includes a communication interface 305 to exchange messages with the communication network 303 to establish a connection of the communication terminal 301 with or via the communication network 303.

The communication network 303 comprises a plurality of subnetworks 307, 311, 315 with a first subnetwork 307, a second subnetwork 311, and further subnetworks, of which subnetwork 315 is exemplarily shown. This plurality of subnetworks corresponds to a plurality of slices 210*b*, 211 *b*, 212*b*, as described above for FIG. 1 and FIG. 2. In the first subnetwork 307, a first identification entity 309 is disposed, with which the communication terminal 301 can be identified. In the second subnetwork 311, a second identification entity 313 is arranged, with which the communication terminal 301 can be identified. The same applies to the other subnetworks, that is, in the nth subnetwork 315 an nth identification entity 317 is arranged, with which the communication terminal 301 can be identified.

A subnetwork identifier 312, 314, 315 is assigned to each subnetwork 307, 311, 315 of the communication network 303. The communication network 303 further comprises a management entity 319, which manages an assignment 321 of the communication terminal 301 to one of the subnetworks 307, 311, 315.

The communication interface 305 of the communication terminal 301 is designed to transmit an identification 302 of the communication terminal 301 to the first identification entity 309 of the first subnetwork 307 in order to initiate a connection setup 308 over the first subnetwork 307.

The communication interface 305 is further designed to receive a subnetwork identifier 306 over the first subnetwork 307, which may be assigned for example to the second subnetwork 311, and which can be filed in the assignment 321 managed by the management entity, for example a table in the management entity.

The communication interface 305 is further designed, in response to reception of the subnetwork identifier 306, to establish a communication link 310 over the second subnetwork 311, i.e. upon assignment of the subnetwork identifier 306 to the second subnetwork 311. If the subnetwork identifier 306 is assigned to another subnetwork, for example to the nth subnetwork 315, the communication interface 305 establishes a communication link 318 over the nth subnetwork 315.

The first identification entity 309 is assigned to the first subnetwork 307 and is designed to receive an identity 302 of the communication terminal 301, and to identify the communication terminal 301 on the basis of the identity 302 for communication over the first subnetwork 307.

The second identification entity 313 is assigned to the second subnetwork 311 and is designed to receive the identity 302 of the communication terminal 301, and to identify the communication terminal 301 on the basis of the identity 302 for communication over the second subnetwork 311.

The management entity 310 is designed to authenticate the communication terminal 301 for communication over the particular subnetwork 307, 311.

The particular identification entity 309, 313 can relay the identity to the management entity 319. The management entity 319 can authenticate the communication terminal 301 on the basis of the relayed identity 302.

The management entity 319 can authenticate the communication terminal 301 with reference to an assignment 321 of subnetworks 307, 311, 315 of the communication network 303 to the communication terminals 301, for example with reference to an assignment 321 of subnetworks 307, 311, 315 to identities 302 of communication terminals 301.

The management entity 319 can authenticate the communication terminal 301 for communication over the first subnetwork 307 if the first subnetwork 307 is assigned to the identity of the communication terminal 301. The management entity 319 can authenticate the communication terminal 301 for communication over the second subnetwork 311 if the second subnetwork 311 is assigned to the identity 302 of the communication terminal 301.

The management entity 319 can relay a subnetwork identifier 314 of the second identification entity 313 to the first identification entity 309 if the communication terminal 301 is authenticated for communication over the second subnetwork 311. The management entity 319 can relay a subnetwork identifier 312 of the first identification entity 309 to the second identification entity 313 if communication is authenticated for communication over the first subnetwork 307.

The first identification entity 309 can relay the subnetwork identifier 314 of the second subnetwork 311 relayed from the management entity 319 to the communication terminal 301 or the second ide 313. The second identification entity 313 can relay the subnetwork identifier 312 of the first subnetwork 307 relayed from the management entity 313 to the communication terminal 301 or the first identification entity 309.

A subnetwork identifier 312, 314 is assigned to each subnetwork 307, 311, for example in the form of a lookup-table. The management entity 319 can assign the communication terminal 301 on the basis of one or more of the following assignments of the subnetwork identifier 312, 314: assignment of the identification 302 of the communication terminal 301, for example to a hardware identifier of the communication terminal 301 such as IMSI or IMEI or eID to the subnetwork identifier 312, 314 and/or to an assignment of a communication service to the communication terminal 301 and/or assignment of a software application to the communication terminal 301, and/or of an operating system of the particular communication terminal 301 to one of the two subnetworks 307, 311.

The communication network 303 can be a network of a fifth generation (5G) or a further generation, for example according to the description and FIGS. 1 and 2. The first subnetwork 307 and the second subnetwork 311 can be slices of the communication network 303, for example slices 210b, 211b, 212b, or slice instances 210a, 211a, 212a of the application layer 103 as in FIGS. 1 and 2.

The specific identification entity 309, 313 can receive a subnetwork identifier 306 from the communication terminal 301, and assign to the communication terminal 301 that subnetwork 307, 311 of the communication network 303 that is assigned to the received subnetwork identifier 306 or corresponds to a subnetwork indicated by the received subnetwork identifier 306. Thus the particular identification entity 309, 313 can provide efficient roaming.

The first identification entity 309 can establish communication of the communication terminal 301 over the first subnetwork 307 if the communication terminal 301 is authenticated for communication over the first subnetwork 307. The second identification entity 313 can establish communication of the communication terminal 301 over the second subnetwork 311 if the communication terminal 301 is authenticated for communication over the second subnetwork 311.

The specific identification entity 309, 313 can authorize the communication terminal 301 for communication, establish or modify a communication bearer (communication carrier, for example a radio channel) for communication, track a communication bearer when there is a change of network entity of the particular subnetwork 307, 311, or relay the communication to a further identification entity within the same subnetwork of the communication network 303.

The specific identification entity 309, 313 can furthermore comprise the functions of an MME according to LTE network topology.

The particular identification entity 309, 313 can be interpreted to mean managing a location of the communication terminal 301.

The communication system 300 can have a base station, for example an eNodeB, with which the first identification entity 309 and the second identification entity 313 can be communicatively connected. The base station can receive a connection request from the communication system 301 with identification 302 of the communication terminal 301 and relay the identification 302 to the particular identification entity 309, 313 for the purpose of identification of the communication system 301.

The first subnetwork 307 can be a default subnetwork. The base station can receive the connection request of the communication system 301 and relay it to the first identification entity 309 if the connection request has no subnetwork identifier 306 which identifies a subnetwork 307, 311.

Below an exemplary establishment of communication is described such as can occur in the communication system 300 over the communication network 303.

The first identification entity 309 of the first subnetwork 307, which for example is assigned as the default subnetwork with default identification entity to the communication system 301, receives an identification 302 of the communication system 301. This identification 302 identifies the communication system 301. On this basis of this identification 302, the first identification entity 309 identifies the communication terminal 301. The tasks of this first identification entity 309 here can correspond to those of an MME (Mobility Management Entity) in the LTE network or may include them. The identification take place using an IMSI or a temporary identification feature of the communication terminal 301, for example a UE, linked thereto.

After this, from the management entity 319, on the basis of an assignment 321 of a subnetwork identifier 306 a subnetwork is assigned to the communication terminal 301.

There follows the establishment of a communication connection 308 of the communication terminal 301 over the first subnetwork 307 if the subnetwork identifier 306 assigned to the identification 302 of the communication terminal 301 corresponds to the subnetwork identifier 312 of the first subnetwork 307. Alternatively, the establishment of a communication connection 310 of the communication system 301 over the second subnetwork 311 or over some other subnetwork, for example a communication connection 318 over the nth subnetwork 315 if the subnetwork identifier 306 assigned to the relayed identification 302 and the subnetwork identifier 312 of the first subnetwork 307 are different or if the subnetwork identifier 306 assigned to the relayed identification 302 corresponds to the subnetwork identifier 312 of the second subnetwork 311 or of the nth subnetwork 315.

The tasks of the management entity 319 can here correspond to those of an HSS (Home Subscriber Server) in an LTE (Long Term Evolution) network or may include them, that is, the following procedure may take place in the communication network 303 for establishment of connection.

First, the management entity 319 provides the parameters required for authentication and, subsequently, for safety related procedures, such as encryption and protection of the message integrity. They can be a random value RAND, a key $K_{ASME}$, the expected result of the authentication verification XRES, as well as the authentication token AUTN. These 4 parameters can be sent as a so-called authentication vector by the management entity 319 to the respective sub-network.

RAND and AUTN can be transmitted by the first identification entity 309, for example via a first communication node (not shown, e.g. an eNodeB (base station) to the communication terminal 301, for example a UE (user equipment). The first communication node can be arranged between the communication system 301 and the first subnetwork 307 in order to allow communication of the communication system 301 with the first identification entity 309. Further, the first communication node can be connected to additional subnetworks 311, 315, in order to allow communication of the communication system 301 with additional subnetworks 311, 315. The first communication node can be reached for example via RAT (Radio Access Technology), for example WLAN, WiFi, mobile radio air interfaces etc.

From a secret key stored on the UICC, the communication terminal 301 can likewise derive a few parameters such as $K_{ASME}$, which allow it using the AUTN to test the authenticity of the communication network 303, and from RAND and $K_{ASME}$ and to calculate the value of RES by means of a specific algorithm. This value can then be sent, for example via the first communication node, to the first identification entity 309. If RES and XRES are the same, the first identification entity 309 sends a message to the management entity 319 to notify the it that the authentication of the communication system 301 was positively concluded. The management entity can then send a list for this communication system 301 with permitted connections (PDS Subscription Context With QoS Profiles) to the first identification entity 309.

Then the first identification entity 309 can establish a default carrier (for example an IP connection) from the communication system 301, for example over a Serving Gateway (S-GW) to a Packet Data Network-Gateway (PDN-GW) and inform the communication system 301 about the successful log-in process.

Now the communication system 301 can communication over the communication network 303. Further connection requests from the PDN-GW or communication system 301 for additional carriers or modifications of the existing carriers can be authorized by the first identification entity 309 on the basis of data received by the management entity 319.

The communication connection 310 can be established over the second subnetwork 311 if the subnetwork identifier 306 assigned to the relayed identification 302 is the subnetwork identifier 314 of the second subnetwork 311.

Alternatively, the communication connection 310 can be established over the nth subnetwork 315 if the subnetwork identifier 306 assigned to the relayed identification 302 is the subnetwork identifier 316 of the nth subnetwork 315.

The communication network 303 can be a network of a fifth generation (5G) or a further generation, and the subnetworks 307, 311, and 315 can be slices of the communication network 303, as described above in FIGS. 1 and 2.

The management entity 319 can effect the assignment 321 of the subnetwork identifier 306 to the communication system 301 on the basis of one or more of the following assignments: assignment of the identification 302 of the communication terminal 301, for example a hardware identifier of the communication terminal 301 such as IMSI or IMEI or eID to the subnetwork identifier 306 and/or an assignment of a communication service to the communication terminal 301 and/or an assignment of a software application to the communication terminal 301 and/or an operating system of the communication terminal 301 to one of the two subnetworks 307, 311.

Subnetworks can be assigned to different applications or services, so that the communication terminal 301 in further dependence hereon can communication over multiple subnetworks 307, 311, 315. The subnetworks can differ from one another in different functions, services, or applications.

Apart from the assignment of communication terminal(s) 301 to subnetwork identification, the management entity 319 can also include assignment of subnetwork identifiers 312, 314, 316 to subnetworks 307, 311, 315, which can be stored, for example, in a table or a storage of the management entity 319.

The communication terminal 301 can relay the identification 302 of the communication terminal 301 to the first 309 or second 313 identification entity along with the subnetwork identifier 306, which indicates the subnetwork 307, 311, 315 assigned to the communication terminal 301, to the first identification entity 309 or other identification entities 313, 317.

During assignment of a subnetwork to the communication terminal 301, the management entity 319 can relay the subnetwork identifier 306 assigned to the identification 302 of the communication terminal 301 to the first identification entity 309. If the subnetwork identifier 306 assigned to the identification 302 of the communication terminal 301 and the subnetwork identifier 312 of the first subnetwork 307 are different, the first identification entity 309 can relay the relayed subnetwork identifier 306 to the communication terminal 301. If the subnetwork identifier 306 assigned to the identification 302 of the communication terminal 301 and the subnetwork identifier 312 of the first subnetwork 307 are different, the first identification entity 309 can relay the relayed subnetwork identifier 306 to the second identification entity 313.

During establishment of the communication connection 310 over the second subnetwork 311, the communication terminal 301 can relay the identification 302 to the second identification entity 313.

During establishment of the communication connection 310 over the second subnetwork 311, the second identification entity 313 can identify the communication terminal 301 on the basis of the identification 302 of the communication terminal 301. After identification of the communication terminal 301, the following steps can be carried out: Assignment of a subnetwork 307, 311, 315 to the communication terminal 301 by the management entity 319 on the basis of the assignment 321 of an subnetwork identifier to the communication terminal 301; and establishment of a communication connection 310 of the communication terminal over the second subnetwork 311 if the subnetwork identifier 306 assigned to the identification 302 of the communication terminal 301 corresponds to the subnetwork identifier 315 of the communication network 303 or a denial of the communication terminal 301 may occur if the subnetwork identifier 306 assigned to the identification 302 of the communication terminal and the subnetwork identifier 314 of the second subnetwork 311 are different.

Connection establishment can be recursive here. That is, first an attempt is made to establish communication over the first subnetwork 307. If this is not possible based on non-matching subnetwork identifier 306 of the communication terminal 301, an attempt is made to establish communication over the second subnetwork 311. If this is not possible due to the non-matching subnetwork identifier 306 of the communication terminal, an attempt is made to establish communication over a further, for example nth subnetwork 315. If this last attempt is not possible due to non-matching subnetwork identifier 306 of the communication terminal 301, establishment of communication is denied. Alternatively, communication can also be denied earlier, for example after the 1st, 2nd, 3rd unsuccessful attempt.

During establishment of the particular communication connection 308, 310, 318, the communication terminal 301 can relay the subnetwork identifier 306 assigned to the relayed identification 302 to the first 309 or second 313 identification entity.

The particular identification entity 309, 313 or the management entity 319 can assign a subnetwork 307, 311, 315 of the communication network 303 to the communication terminal 301 on the basis of the relayed subnetwork identifier 306 if the relayed subnetwork identifier 306 indicates a subnetwork of a different communication network, for example a foreign network. Here the particular identification entity 309, 313 or the management entity 319 can assign that subnetwork 307, 311, 315 of the communication network 303 to the communication terminal 301 that corresponds to the subnetwork of the other communication network. The subnetworks in different communication networks can have different identifiers. With the corresponding assignment of the subnetwork in the communication network 303 to the communication terminal 301 which corresponds to the relevant subnetwork in the other network, that is, for example the subnetwork in the other network that offers the same services, roaming in foreign networks can be facilitated. This assignment can be effected for example by means of look-up tables that can be filed or stored in the particular identification entity 309, 313 or the management entity 319.

The communication connection 308 over the subnetwork 307 can be established by the first identification entity 309; the communication connection 310 can be established over the second subnetwork 311 by means of the second identification entity 313. The communication connection 318 over the nth subnetwork 315 can be established by the nth identification entity 317. Alternatively, these communication connections 308, 310, 318 may also be established using the communication terminal 301.

Figure 4:
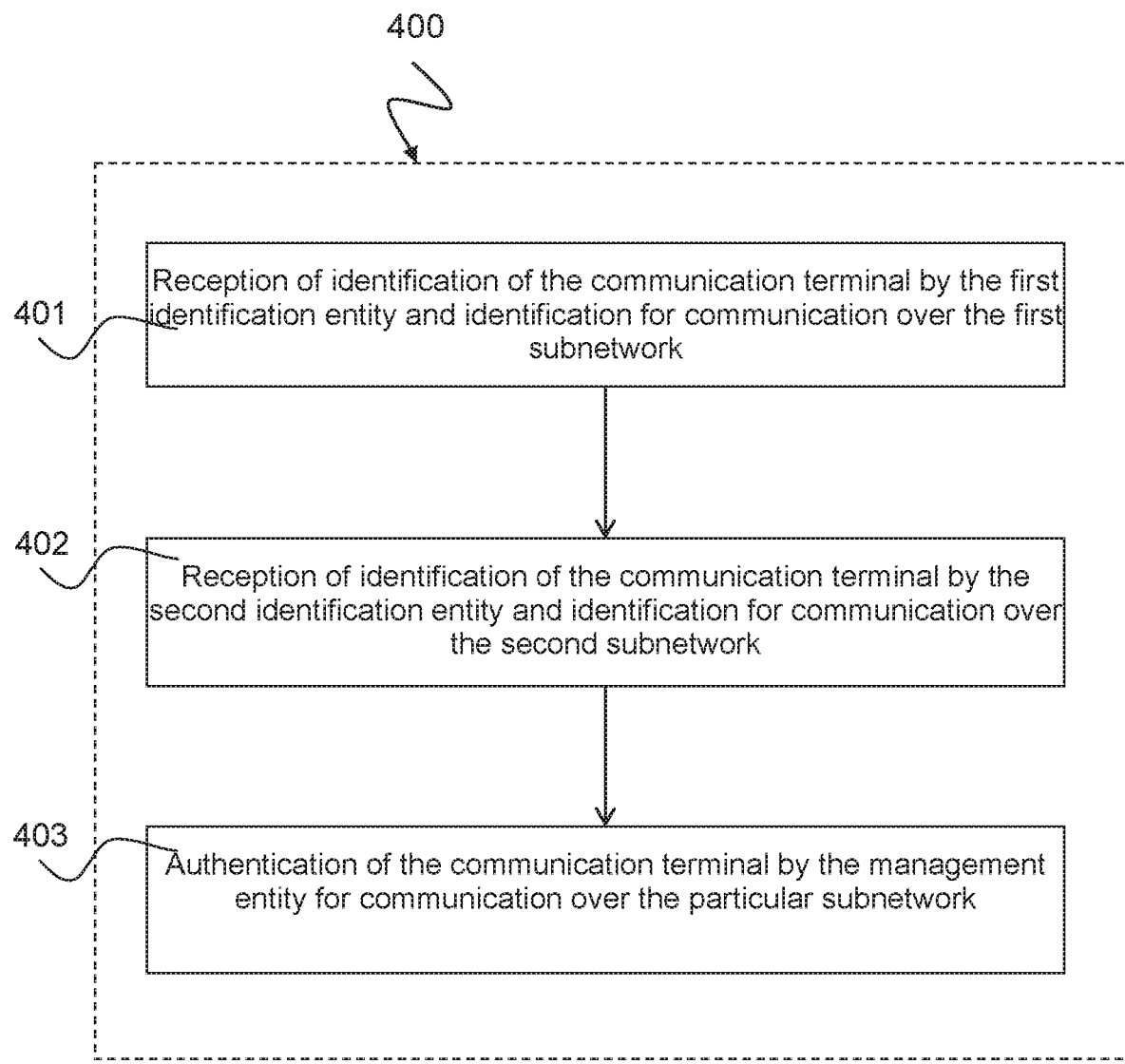
FIG. 4 is a schematic representation of a method 400 for communication in a communication network having a plurality of subnetworks according to an embodiment of the invention.

FIG. 4 shows a schematic representation of a method 400 for communication in a communication network with a plurality of subnetworks according to an exemplary embodiment.

The communication network can correspond to the communication network 303 described in FIG. 3. That is, the communication network 303 comprises a plurality of subnetworks 307, 311, 315 with a first subnetwork 307 and a second subnetwork 311. In the first subnetwork 307, a first identification entity 309 is arranged for identifying the communication terminal 301, and in the second subnetwork 311 a second identification entity 313 is arranged for identifying the communication terminal 301. A subnetwork identifier is assigned to each subnetwork 307, 311, 315 of the communication network 303. A management entity 319 is arranged in the communication network 303 and manages assignment 321 of the communication terminal 301 to one of the two subnetworks 307, 311.

The method 400 comprises receipt 401 of an identity 302 of a communication terminal 301 by means of a first identification entity 309, which is assigned to a first subnetwork 307, and identification of the communication terminal 301 on the basis of the identity 302 for communication over the first subnetwork 307.

The method 400 further comprises receipt 401 of the identity 302 of the communication terminal 301 by means of a second identification entity 313, which is assigned to a second subnetwork 311, and an identification of the communication terminal 301 on the basis of the identity 302 for communication over the second subnetwork 311.

The method 400 further comprises authentication of the communication terminal 301 for communication over the particular subnetwork 307, 311 by a management entity 319.

The method 400 can further comprise the following: relay of the identity 302 to the management entity 319 by the particular identification entity 309, 313; and authentication of the communication terminal 301 on the basis of the relayed identity 302 by the management entity 319.

The method can further comprise the following: authentication of the communication terminal 301 using an assignment 321 of subnetworks 307, 311, 315 of the communication terminal 303 to the communication terminals 301 by the management entity 319, in particular using an assignment 321 of subnetworks 307, 311, 315 to identities 302 of communication terminal 301.

The method 400 can further comprise the following: authentication of the communication terminal 301 for communication over the first subnetwork 307 by the management entity 319 if the first subnetwork 307 is assigned to the identity of the communication terminal 301, or authentication of the communication terminal 301 for communication over the second subnetwork 311 by the management entity 319 if the second subnetwork 311 is assigned to the identity 302 of the communication terminal 301.

The method 400 can further comprise: relay of a subnetwork identifier 314 of the second identification entity 313 to the first identification entity 309 by the management entity 319 if the communication terminal 301 fir communication over the second subnetwork 311 is authenticated, or relay of a subnetwork identifier 312 of the first identification entity 309 to the second identification entity 313 by the management entity 319 if the communication terminal 301 is authenticated for communication over the first subnetwork 307.

The method 400 can further comprise: relay of the subnetwork identifier 314 of the second subnetwork 311 relayed by the management entity 319 by the first identification entity 309 to the communication terminal 301 or to the second identification entity 313; or relay of the subnetwork identifier 312 of the first subnetwork 307 relayed by the management entity 319 by means of the second identification entity 313 to the communication terminal 301 or to the first identification entity 309.

The method 400 can further comprise the following: assignment of the communication terminal 301 on the basis of at least one of the following assignments of the subnetwork identifier 312, 314 by the management entity 319: an assignment of the identification 302 of the communication terminal 301, in particular a hardware identifier of the communication terminal 301 such as IMSI or IMEI or eID to the subnetwork identifier 312, 314, and or assignment of a communication service to the communication terminal 301 and/or assignment of a software application to the communication terminal 301, and/or an operating system of the particular communication terminal 301 to one of the two subnetworks 307, 311.

The communication network 303 can be a network of a fifth generation (5G) or further generation as described above in FIGS. 1 and 2. The first subnetwork 307 and the second subnetwork 311 can be slices of the communication network 303, as described above in FIGS. 2 and 3.

The method 400 can further comprise the following: receipt of a subnetwork identifier 306 from the communication terminal 301 by means of the particular identification entity 309, 313 and assignment of the subnetwork to the communication terminal 301 that is assigned to the received subnetwork identifier 306 or corresponds to a subnetwork indicated by the received subnetwork identifier 306. Roaming is thus efficiently enabled.

The method 400 can further comprise the following: establishment of communication of the transition 301 over the first subnetwork 307 by means of the first identification entity 309 if the communication terminal 301 is authenticated for communication over the first subnetwork 307, and establishment of communication of the communication terminal 301 over the second subnetwork 311 by the second identification entity 313 if the communication terminal 301 is authenticated for communication over the second subnetwork 311.

The method 400 can further comprise the following: authorization of the communication terminal 301 for communication by means of the particular identification entity 309, 131; establishment or modification of a communication bearer for communication, tracking of a communication bearer when there is a change in a network entity of the particular subnetwork 307, 311, and transfer of communication to a different identification entity of the same subnetwork of the communication network.

The method 400 can further comprise the following: management of a location of the communication terminal 301 by the particular identification entity 309, 313.

The method 400 can further comprise the following: receipt of a connection request with the identification 302 from the communication terminal 301 by a base station and relay of the identification 302 to the particular identification entity 309, 313 to identify the communication terminal 301, wherein the first identification entity 309 and the second are communicatively connected to the first communication node, as described above in FIG. 3.

The method 400 can further comprise the following: receipt of the connection request of the communication terminal by the base station and forwarding of the connection request to the first identification entity 309 if the connection request does not include a subnetwork identifier 306 that identifies a subnetwork 307, 311, wherein the first subnetwork 307 is a default subnetwork.

Figure 5:
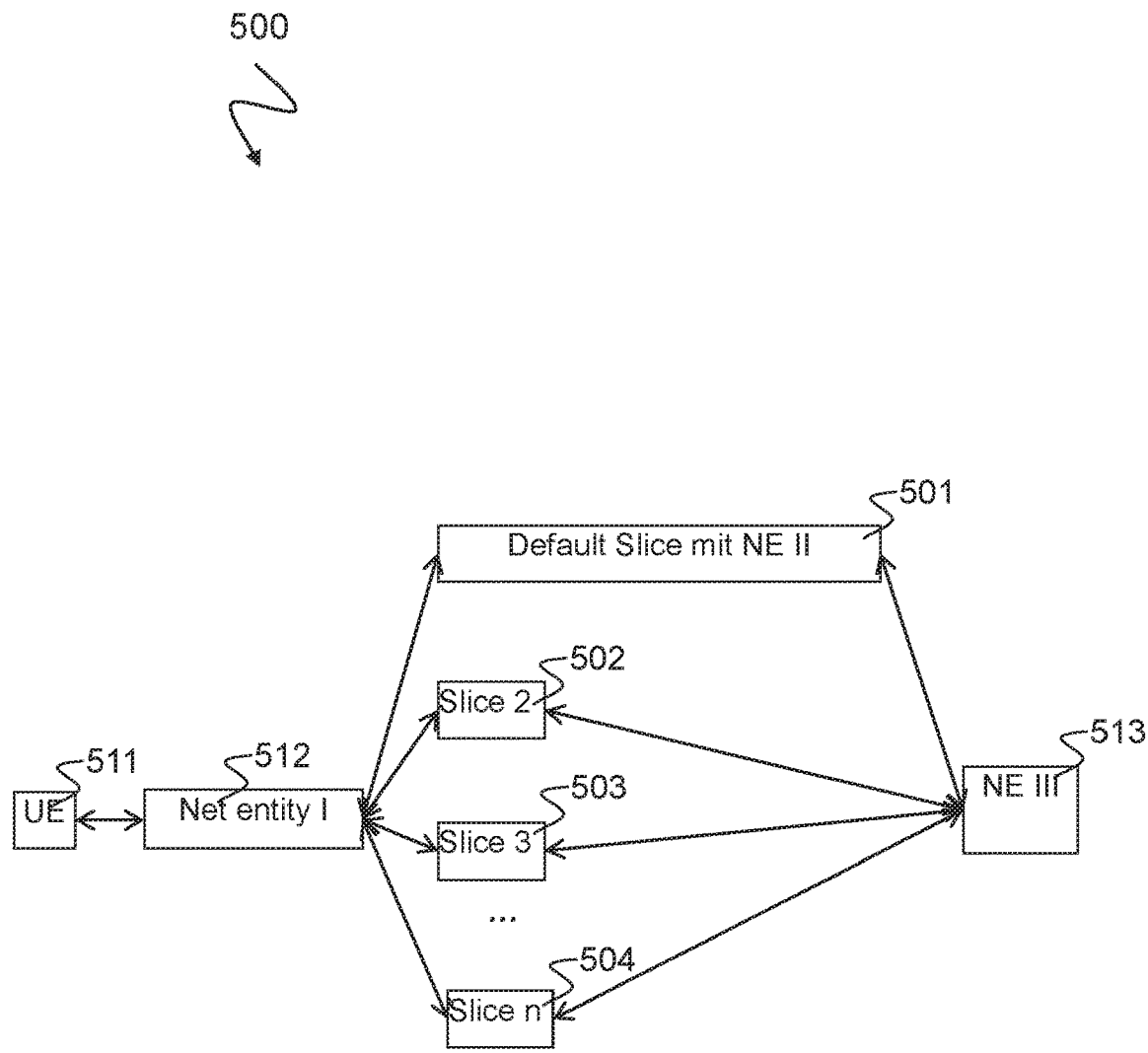
FIG. 5 is a schematic representation of the log-on process of a communication terminal in a communication network using the example of a 5G network 500 according to an embodiment of the invention.

FIG. 5 shows a schematic representation of the login process of a communication terminal into a communication network in the example of a 5G network 500 according to an exemplary embodiment. The 5G network 500 comprises a UE 511, a first net entity or network entity, a plurality of slices 501, 502, 503, 504, to each of which a second net entity is assigned, and a third net entity 513. The UE (User Equipment) is an example of a communication terminal 301 described above in FIGS. 3 and 4. The first net entity 512 can correspond to the first communication node described above in FIG. 3. This may be for example an eNodeB or a base station. The slices 501, 502, 503, 504 can correspond to the subnetworks 307, 311, 315 described above in FIGS. 3 and 4 or the network slices 210b, 211b, 212b described in FIG. 2, or instances 210a, 211a, 212a of these network slices. Naturally any other of the slices 502, 503, 504 can be specified as the default slice. The third net entity 513 can correspond to the network entity 319 described above in FIGS. 3 and 4. It can be arranged for example in the Management and Orchestration Plane described in FIG. 1. The third net entity 513 can inter alia also perform the tasks of an HSS according to LTE terminology.

In one embodiment the structure of the 5G network 500 is similar to the structure of an LTE network. Of course the home network has sever subnets 501, 502, 503, 504, which are termed slices. The UE is thus assigned not only to the home net (via the third net entity 513, comparable to the HSS), but also assigned to the particular slice. The second net entities can by analogy with an MME according to LTE terminology simultaneously be part of the default slice 501, which depends on the precise function. The subnets 501, 502,503,504 can then each have a connection to the third net entity 513 by analogy with the HSS according to LTE, as shown here in FIG. 5.

Below an exemplary login process into the 5G network 500 is described. The UE 511 connects over the first net entity 512 to the second net entity of the default slice 501. The second net entity of the default slice 501 identifies the UE 511 using the IMSI or one of the temporary identification features connected to it and directs the request of the UE 511 to log into the net to the third net entity 513.

First the third net entity 513 provides the parameters that are required for authentication and later on for security-relevant processes such as encryption and protection of the integrity of messages. These are a random RAND value, a key $K_{ASME}$, the expected result of the authentication test XRES, as well as the Authentication Token AUTN. These 4 parameters are sent as the so-called authentication vector from the third net entity 513 to the second net entity of the default slice 501. RAND and AUTN are sent by the second net entity of the default slice 501 via the first net entity 512 to the UE 511. The UE 511 can likewise derive a number of parameters, such as $K_{ASME}$ from a confidential key stored in the UICC, that allow it with the help of the AUTN to test the authenticity of the net and from RAND and $K_{ASME}$ to calculate the value of RES using a specific algorithm. This value is sent via the first net entity 512 to the second net entity of the default slice 501. If RES and XRES are equal, the second net entity of the default slice 501 sends a message to the third net entity 512 to notify it that the authentication of the UE 511 was positively concluded. The third net entity 513 then sends a list of permitted connections for this UE 511, for example PDN (Packet Data Network), subscription contexts with QoS (Quality of Service) profiles, to the second net entity of the default slice 501.

Then the second net entity of the default slice 501 establishes a default bearer or carrier (e.g. an IP connection) from the UE 511 to for example a PDN-GW over an S-GW for example and informs the UE 511 of the successful login process. Now the UE 511 can communication over the communication network. Further connection requests from the PDN-Page GW or UE511 for additional bearers or modifications of the existing bearers can be authorized by the second net entity of the default slice 501 on the basis of the data received by the third net entity 513.

All subnets (slices) 501, 502, 503, 504 are predefined both with respect to subnet structure (i.e. what functionalities are present, what net topology is defined) as well as with regard to functionality.

The net entities II (on default slice 501) and III 513 are assigned to the Control Plane. The net entity I 512 is assigned both to the Control Plane and to the User Plane, for example signaling between net entity I 512 and net entity II (on default slice 501) can occur on the Control Plane (CP), while the user data can run between net entity I 512 and S-GW and PDN-GW on the User Plane (UP). The subnets 501, 502, 503, 504 run logically in the net entity III 513. There are several possibilities for net entity II: If the functional scope is similar to the MME according to LTE terminology, then net entity II is a part of the default slice 501, as shown in FIG. 5. In each case there is the following 2-stage process:

a) The UE 511 attempts to log in, is fully authenticated by net entity II and III 513 as described above and is either assigned to a different slice or left in the default slice 501. This default slice 501 can in one embodiment a Standard Multimedia Broadband Net.

b) If the UE 511 is assigned to a different slice, the net entity I 512 repeats the login process in the direction of the indicated slice (and of the net entity II therein) and the UE 511 is logged out of the default slice 501 if successful.

In terms of process this can correspond for example to a Tracking Area Update according to LTE terminology, thus to the method that is carried out if the UE 511 comes from the region of an MME/S-GW into another MME/S-GWs, wherein however the net entity I 512 in contrast thereto (where the eNodeB of a net is connected only to an MME), can select a different net entity II based on the subnet identifier.

In an implementation form, this can result in a) or b) or in a) and b) in an authentication of the UE 511. This can be structured roughly similarly to the above described Tracking Area Update.

In one implementation form, the net entity II possesses only the functionality that is necessary so as to define the slice with the net entity III 513. Then it is not part of the default slice and there is always a step b).

The net entity III 513 identifies the UE 511 using the IMSI for example, and assigns the UE 511 to the appropriate slice, for example subnet I 501. The allocation of the slice proceeds on the basis of the data stored in net entity III as well as optionally with inclusion of the parameters that are transferred during login of UE 511 to the net entity II. These can be hardware identification (e.g. the IMEI), Operating System Infos, or Application IDs.

In an alternative variant, UE 511 conveys the identifier of the corresponding subnet in the second step b). That is the identifier that it obtained in the first step a) from net entity III via net entity II. Then in step b) UE 511 repeats the login process in the direction of the allocate slice. That is, in this alternative the slices in UE 511 run together, not into net entity I 511.

In this alternative variant, instead of its own ID (e.g. IMSI), the UE 511 can give its own ID along with the slice ID each time a connection is established. In this way the correct net entity II can always be selected, the net entity I 512 does not have to store the status of UE 511, and the UE 511 can also be a part of several slices. This also simplifies the procedures with a change of net entity I 512.

In a further alternative variant, UE 511 supplies the identifier of the subnet from the start. The subnet can contain an S-GW (analog) for example, a PDN-GW (analog) etc. These net entities are parameterized. This occurs via net entity II as needed—when a new bearer is established, for example.

After assignment of the slice and login in same, the net entity II, which has served as the first contact point for login, is no longer integrated in the signal flow (except that UE 511 remains in the default slice 501 and the net entity II is a part of the default slice 501).

After parameterization, the UE 511 can communicate over the subnet I 501 for example in the Internet, or register in IMS and use telecommunication services (e.g. telephony).

The subnets Ito n 501, 502, 503, 504 are decoupled from one another.

The above concept applies analogously to logging into a foreign net. Here analogously the net entity III takes over the selection of the subnet and the parameters. In the foreign network, the net entity II in the visited net will select the predefined subnet of the foreign net that corresponds to the home network (for example through the look-up table).

One aspect of the invention also comprises a computer program product that can be loaded directly into the internal storage of a digital computer and comprises software code segments, with which the method 400 described in FIG. 4 or the processes described in FIGS. 3 and 5 can be executed if the product runs on a computer. The computer program product can be stored on a computer on a non-transitory medium suitable for computer use and computer-readable program means that instruct a computer to execute the method 400 or to implement or control the net components of the communication nets described in FIGS. 1 to 5.

The computer can be a PC, for example a PC of a computer network. The computer can be implemented as a chip, ASIC, microprocessor, or signal processor and can be arranged in a computer network, for example in a communication network as described in FIGS. 1 to 5.

It is to be understood that the features of the various embodiments described by way of example herein may be combined with each other, unless specifically indicated otherwise. As shown in the description and the drawings must individual elements that have been shown related, not directly with each other; Intervening elements may be provided between the connected elements. Furthermore, it is obvious that may be implemented embodiments of the invention in single circuits, partially integrated circuits or fully integrated circuits or programming means. The term "exemplary" is merely meant as an example and not as the best or optimal. There are specific embodiments illustrated and described herein, but for the expert it is clear that a variety of alternate and/or equivalent implementations instead of the shown and described embodiments may be made without departing from the concept of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100: 5G system architecture
101: access device, communication terminal UE
102: access Technology
103: application Layer
104: activation layer
105: infrastructure resource layer
106: Management & Orchestration layer
200: 5G communications network with several slices
210a: first slice Instance
210b: first network slice
211a: second slice instance
211b: second network slice
212: third slice Instance
212b: third network slice
213: slice composition
221: abstracted objects
222: virtual network features
223: combined objects
224: aggregated objects
225: object library
231: access node
232: access node
233: access node
234: virtual network node
235: virtual network node
236: virtual network node
237: virtual network node
238: computer node
239: computer node
240: computer node
251: infrastructure services
300: communication system
301: communication terminal, e.g. UE
302: identification of communication terminal
303: communication network
304: connection between 1st subnetwork and management entity
305: communication interface
306: subnetwork identifier of the communication terminal
307: 1st subnetwork
308: establishing a connection over 1st subnetwork
309: 1st identification entity
310: establishing a connection over 2nd subnetwork
311: 2nd subnetwork
312: 1st subnetwork identifier
313: 2nd identification entity
314: 2nd subnetwork identifier
315: n. subnetwork
316: n. subnetwork identifier
317: n. identification entity
318: establishment of connection over the nth subnetwork
319: management entity
321: assignment of communication terminal to subnetwork identifier
400: method for establishing a communication connection
401: first step: receipt over the 1st subnetwork
402: second step: receipt over 2nd subnetwork
403: third step: authentication
500: 5G communication network
501: default slice with net entity II or second net entity
502: slice 2
503: slice 3
504: slice n
511: UE or communication terminal
512: first net entity or net entity I
513: third net entity or net entity III

The invention claimed is:

1. A communication system, comprising:
a plurality of identification entities corresponding to a plurality of subnetworks of a communication network having a plurality of respective subnetwork identifiers, wherein each identification entity of the plurality of identification entities corresponds to a respective subnetwork of the communication network having a respective subnetwork identifier, wherein the communication network is a fifth generation (5G) or further generation network, wherein each respective subnetwork of the communication network is a respective slice of the communication network, and wherein at least one identification entity of the plurality of identification entities is configured to receive an identity of a communication terminal; and
a management entity configured to:
assign a subnetwork identifier to the communication terminal based on: the identity of the communication terminal, an identity of a software application of the communication terminal, and/or operating system information of the communication terminal;
authenticate the communication terminal for communication over an assigned subnetwork corresponding to the assigned subnetwork identifier; and
manage a correspondence between the plurality of subnetworks and the plurality of subnetwork identifiers via a lookup table;
wherein each respective slice of the communication network comprises a software-defined entity that is based on a set of objects that define a complete network, wherein each slice supports communication services of a certain type of connection, and wherein each slice is made up of a collection of different network functions and radio access technology settings that are combined together;

wherein the management entity is configured to relay to a first identification entity a subnetwork identifier of a second subnetwork in response to the communication terminal being authenticated for communication over the second subnetwork, wherein the second subnetwork corresponds to a second identification entity.

2. The communication system according to claim 1, wherein the at least one identification entity is configured to relay the identity of the communication terminal to the management entity, and wherein the management entity is configured to authenticate the communication terminal based on the relayed identity.

3. The communication system according to claim 1, wherein the management entity is configured to authenticate the communication terminal with reference to an assignment of subnetworks of the communication network to communication terminals.

4. The communication system according to claim 1, wherein the management entity is configured to authenticate the communication terminal for communication over a respective subnetwork in response to the respective subnetwork being assigned to the identity of the communication terminal.

5. The communication system according to claim 1, wherein the first identification entity is configured to relay the subnetwork identifier of the second subnetwork to the communication terminal or to the second identification entity.

6. The communication system according to claim 1, wherein the at least one identification entity is configured to receive a subnetwork identifier from the communication terminal and to assign to the communication terminal a subnetwork corresponding to the received subnetwork identifier.

7. The communication system according to claim 1, wherein the first identification entity is configured to establish communication of the communication terminal over a first subnetwork in response to the communication terminal being authenticated for communication over the first subnetwork, and wherein the second identification entity is configured to establish communication of the communication terminal over the second subnetwork in response to the communication terminal being authenticated for communication over the second subnetwork.

8. The communication system according to claim 1, wherein the at least one identification entity is configured to authorize the communication terminal for communication, to establish or modify a communication bearer for communication, to track a communication bearer when there is a change in a network entity of the at least one subnetwork, and to relay communication to a further identification entity of the same subnetwork of the communication network.

9. The communication system according to claim 1, wherein the at least one identification entity is configured to manage a location of the communication terminal.

10. The communication system according to claim 1, further comprising:
a base station communicatively connected to the at least one identification entity, wherein the base station is configured to receive a connection request from the communication terminal with the identity of the communication terminal, and to relay the identity of the communication terminal to the at least one identification entity for identifying the communication terminal.

11. The communication system according to claim 10, wherein a first subnetwork of the plurality of subnetworks is a default subnetwork, wherein the first subnetwork corresponds to the first identification entity, and wherein the base station is configured to receive the connection request of the communication terminal and to forward it to the first identification entity corresponding to the first subnetwork if in response to the connection request has having no subnetwork identifier which identifies a subnetwork.

12. The communication system according to claim 1, wherein the management entity is configured to authenticate the communication terminal with reference to an assignment of subnetworks to identities of communication terminals.

13. The communication system according to claim 1, wherein the identity of the communication terminal is a hardware identifier of the communication terminal.

* * * * *